United States Patent [19]
Kurematsu

[11] Patent Number: 6,059,023
[45] Date of Patent: May 9, 2000

[54] HEAT EXCHANGER

[75] Inventor: Masayuki Kurematsu, Hino, Japan

[73] Assignee: Konica Corporation, Japan

[21] Appl. No.: 09/157,991

[22] Filed: Sep. 22, 1998

[30] Foreign Application Priority Data

Sep. 25, 1997 [JP] Japan .................................. 9-259492

[51] Int. Cl.[7] .................................................. F28D 9/00
[52] U.S. Cl. .............................. 165/165; 165/DIG. 399; 165/54
[58] Field of Search .................... 165/165, DIG. 399, 165/166, 54

[56] References Cited

U.S. PATENT DOCUMENTS

| | | | |
|---|---|---|---|
| 1,601,637 | 9/1926 | Meigs | 165/166 |
| 3,331,435 | 7/1967 | Valyi | 165/166 X |
| 3,734,177 | 5/1973 | Bellovary et al. | 165/166 |
| 5,282,507 | 2/1994 | Tongu et al. | 165/165 |

FOREIGN PATENT DOCUMENTS

| | | | |
|---|---|---|---|
| 2269694 | 11/1975 | France | 165/165 |
| 118598 | 9/1980 | Japan | 165/165 |
| 44798 | 3/1985 | Japan | 165/165 |
| 61-41895 | 2/1986 | Japan . | |
| 63-43679 | 8/1988 | Japan . | |

*Primary Examiner*—Leonard Leo
*Attorney, Agent, or Firm*—Jordan B. Bierman; Bierman, Muserlian and Lucas

[57] ABSTRACT

In a heat exchanger for exchanging heat of fluids, the heat exchanger is provided with a heat exchanging section having a shape bent alternately consecutively so as to form laminate space and is constructed such that a first flow passage is formed on a space contacting a first surface of the heat exchanging section among the laminate space; and a second flow passage is formed on a space contacting a second surface of the heat exchanging section among the laminate space, wherein a first fluid flows on the first flow passage and a second fluid flows on the second flow passage.

12 Claims, 11 Drawing Sheets

HEAT EXCHANGER

BACKGROUND OF THE INVENTION

This invention relates to a heat exchanger, and in particular, to a heat exchanger used in apparatus or installments such as air conditioning apparatus, automobiles, electric generators, cooling installments, drying installments or apparatus having a heat source or requiring cooling.

As a high-efficiency heat exchanger, for example, as is disclosed in Japanese patent S61-436795, Japanese laid open patent S61-41895, and Japanese laid open patent H6-123570, a laminated-type heat exchanger with increased heat transfer area by laminating a plurality of plate members has been known. This is of the type such that different fluids are made to flow for the respective layers for heat exchanging.

The defect of such a laminated type that has a plurality of plate members laminated is a high manufacturing cost due to laminating a plurality of plate members. In particular, there have been several proposals for sealing the end portions of the plural laminated members and for providing an entrance and exit of fluid to the laminate space, but they could not reduce the manufacturing cost sharply. Further, the plural member laminate type for high pressure or high temperature use and that resistant for corrosiveness is especially of high cost.

SUMMARY OF THE INVENTION

This invention was made in view of the above-mentioned point, and its object is to provide a heat exchanger with a reduced number of parts, for which it is easy to build an automatic assembly line, wherein leakage of fluid hardly occurs, which is excellent in resistivity to high temperatures, high pressures, and corrosiveness and of low cost and capable of being easily manufactured.

In order to solve the above-mentioned problem and accomplish the object, this invention has been made up by the following structure.

In a heat exchanger for exchanging heat of fluids, the heat exchanger is provided with a heat exchanging section having a shape bent alternately consecutively so as to form laminate space and is constructed such that a first flow passage is formed on a space contacting a first surface of the heat exchanging section among the laminate space; and a second flow passage is formed on a space contacting a second surface of the heat exchanging section among the laminate space, wherein a first fluid flows on the first flow passage and a second fluid flows on the second flow passage.

With the above structure, the number of machinery parts can be reduced, it may be difficult for fluid leakage to take place on it.

Further, the above object can be attained by the folloing preferable constructions.

(1) A heat exchanger for making heat exchanging of fluids having laminate spaces formed by bending a thin plate in an alternate manner consecutively by making fluids for heat exchanging flow through the layers being in contact with only one side of said thin plate and through the layers being in contact with the other side of said thin plate respectively.

According to the structure described in the paragraph (1), by forming laminate spaces through bending a thin plate in an alternate manner consecutively, the number of parts is reduced, and it is easy to build an automatic assembly line. Further, leakage of fluid hardly occurs, and it is excellent in resistivity to high temperatures, high pressures, and corrosiveness, is of low cost and can be easily manufactured.

(2) A heat exchanger set forth in the paragraph (1), wherein a rod member is provided at each of the bending portions in such a manner that the thin plate goes around the rod in contact and turns back.

According to the structure set forth in the paragraph (2), the thin plate turns around the rod in a shape of winding contact; hence, the bending portions of the thin plate can be formed securely by the rod members.

(3) A heat exchanger set forth in the paragraph (2), wherein the aforesaid thin plate has flexibility and its both ends are fixed so that a tension can be exerted laterally by said rod members to keep horizontality.

According to the structure set forth in the paragraph (3), the laminate spaces can be easily formed by the flexible thin plate in a shape of consecutive alternate bending, and it is possible to employ an extremely thin plate material in comparison with the conventional method of laminating a plurality of plates, which enables the high performance of the heat exchanging capability.

(4) A heat exchanger having a structure such that laminate spaces are formed by bending a thin plate in an alternate manner consecutively, its zigzag end planes being sealed, so that fluids come into or out of the laminate spaces through the planes containing the bending portions.

According to the structure set forth in the paragraph (4), it is simple the structure for sealing the end plane of the plural laminate layers and for providing an entrance and exit to the laminate spaces for fluid; hence, the number of parts is reduced, and leakage of fluid hardly occurs, further, it is excellent in resistivity to high temperatures, high pressures, and corrosiveness, and can be manufactured simply at low cost.

(5) A heat exchanger set forth in the paragraph (4), wherein the zigzag end plane is sealed and the entrance and exit for fluid is provided at the aforesaid plane containing the bending portions.

According to the structure set forth in the paragraph (5), it is possible to make the entrance and exit of fluid simply at low cost.

(6) A heat exchanger set forth in the paragraph (4) or (5), wherein the aforesaid plane containing the bending portions is covered with a member provided with an entrance and exit for fluid.

According to the structure set forth in the paragraph (6), the entrance and exit for fluid can be made simply at low cost.

(7) A heat exchanger set forth in the paragraph (6), wherein both of the planes of the aforesaid thin plate containing the bending portions are covered with a member having an entrance and an exit at the positions apart from each other so that fluids for both planes are made to flow in the reverse direction to each other.

According to the structure set forth in the paragraph (7), the efficiency of heat exchange is improved and the entrances and the exits can be made simply at low cost.

(8) A heat exchanger set forth in any one of the paragraphs (4) through (7), having a structure such that the aforesaid thin plate is bent in an alternate manner consecutively to form laminate spaces, and at each of the zigzag end planes, a zigzag-shaped member is pressed to it from left or right so as to seal the thin plate and the zigzag-shaped members with a bonding means to prevent leakage of fluid.

According to the structure of the paragraph (8), due to the structure such that a thin plate is bent in an alternate manner consecutively to form laminate spaces, and at each of the zigzag end planes, a zigzag-shaped member is pressed to it from left or right so as to seal the thin plate and the zigzag-shaped members with a bonding means to prevent leakage of fluid, leakage of fluid hardly occurs and the heat exchanger is excellent in the resistivity to high temperatures, high pressures, and corrosiveness, and can be manufactured simply at low cost.

(9) A heat exchanger set forth in the paragraph (8), wherein the aforesaid bonding means is any one of bonding with an adhesive, welding, soldering, and insertion of a packing material.

According to the structure set forth in the paragraph (8), the structure for preventing the leakage of fluid can be simply made with the bonding means.

(10) A heat exchanger set forth in the paragraph (8) or (9), wherein the zigzag of the thin plate is slightly inclined with regard to the horizontal plane and the laminate-space portion of the zigzag-shaped member has a shape like a trapezoid.

According to the structure set forth in the paragraph (10), the structure for preventing the leakage of fluid can be simply made.

(11) A heat exchanger set forth in any one of the paragraphs (4) through (7), wherein the zigzag thin plate and the structures of the end plane portion described in the paragraphs (4) through (7) are made by forming using a die.

According to the structure set forth in the paragraph (11), the laminate spaces formed by bending a thin plate in an alternate manner consecutively can be made simply by forming using a die.

DETAILED DESCRIPTION OF THE PREFERRED EMBODIMENT

In the following, the embodiment of this invention will be explained with reference to the drawings.

Figure 1:
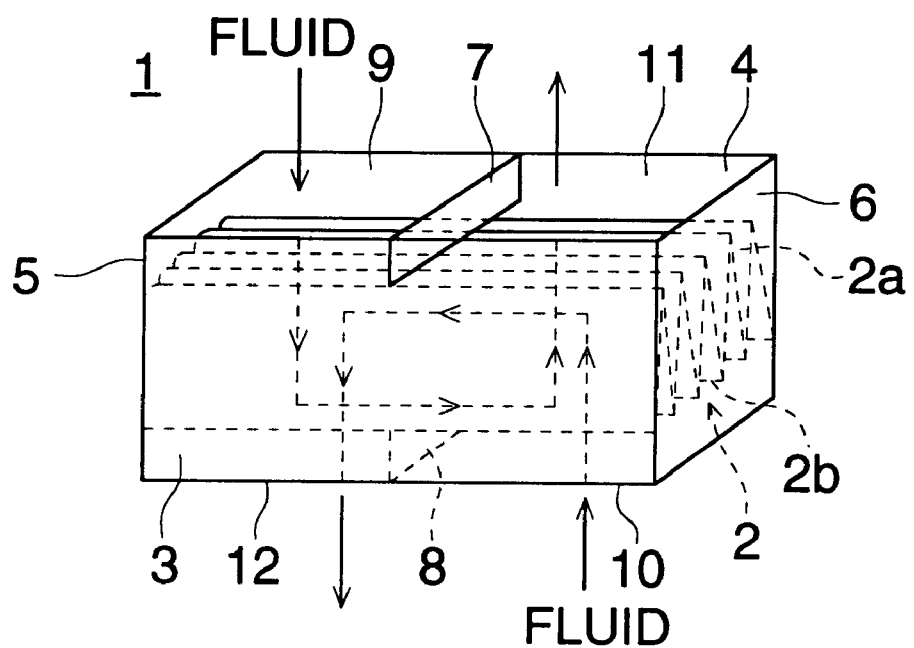
FIG. 1 is a perspective view of an embodiment of the heat exchanger.

FIG. 1 is a perspective view of the heat exchanger. The heat exchanger in this embodiment 1 has a structure such that the thin plate 2, which is the heat-exchanging portion, is bent in an alternate manner consecutively to form a laminate spaces 2a and 2b, forming the layers being in contact with only one side of the thin plate 2 and the layers being in contact with the other side of the thin plate, and both the end planes in the bending direction are sealed with the blocking members 3 and 4 which have wider width than the width of the bends of the thin plate 2, and further, both the zigzag end planes formed by bending are sealed with blocking members 5 and 6 which have wider width than the width of the bends of the thin plate 2.

Further, the heat exchanger is made up also in a manner such that a dividing plate 7 is provided on the side of the layers being in contact with only one side of the thin plate 2, and a dividing plate 8 is provided on the side of the layers being in contact with the other side of the thin plate 2, to form the entrances 9 and 10 and the exits 11 and 12 respectively, so that fluids come into and/or out of the laminate spaces 2a and 2b through the planes containing the bending portions.

The above-mentioned thin plate 2, blocking members 3 and 4, blocking members 5 and 6, dividing plate 7, and dividing plate 8 are bonded with a bonding means. As for the bonding means, any one of the bonding with an adhesive, welding, soldering, and insertion of a packing material is employed, and the structure for preventing the leakage of fluid can be simply made by the bonding means.

In this manner, by making fluids for exchanging heat flow through the layers being in contact with only one side of the thin plate 2 and through the layers being in contact with the other side of the thin plate 2 respectively, heat exchanging of the fluids can be carried out. Further, by forming laminate spaces 2a and 2b through bending the thin plate 2 in an alternate manner consecutively, the number of parts can be reduced; and furthermore, it is easy to build an automatic assembly line, the leakage of fluid hardly occurs, and the heat exchanger is excellent in resistivity to high temperatures, high pressures, and corrosiveness, and can be manufactured simply at low cost.

Further, due to the structure such that the laminate spaces 2a and 2b are formed by bending the thin plate 2 in an alternate manner consecutively, the zigzag end planes are sealed, and fluids come into and out of the laminate spaces 2a and 2b through the planes containing the bending portions, it becomes simple the structure for sealing the end planes of the plural laminate layers and for providing an entrance and exit to each of the laminate spaces for fluids, and the number of parts can be reduced; and further, the leakage of fluids hardly occurs, the heat exchanger is excellent in resistivity to high temperatures, high pressures, and corrosiveness, and can be manufactured simply at low cost.

Figure 2:
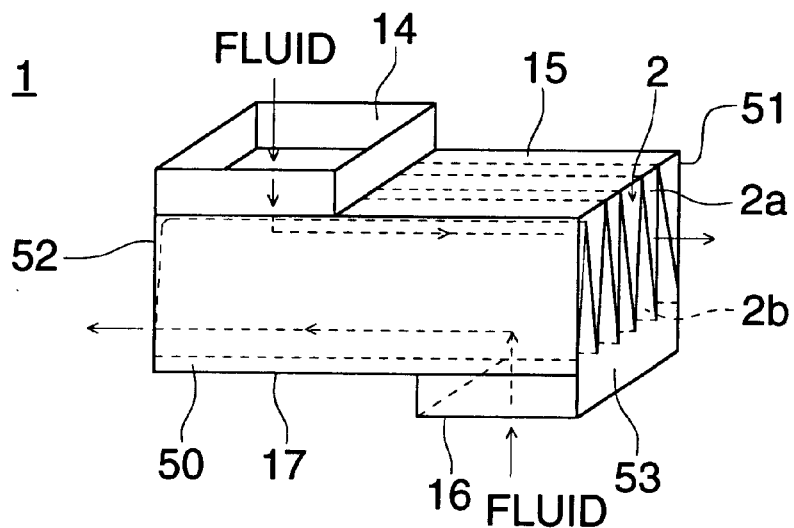
FIGS. 2(a) to 2(c) are perspective views of another embodiment of the heat exchanger.
Figure 2:
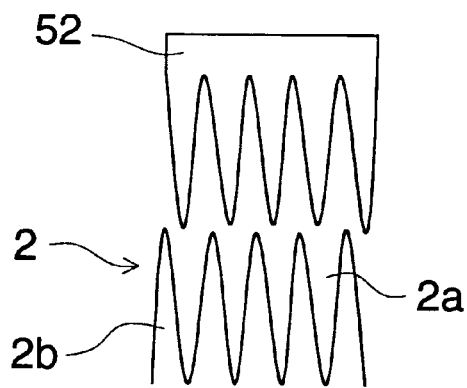
Figure 2:
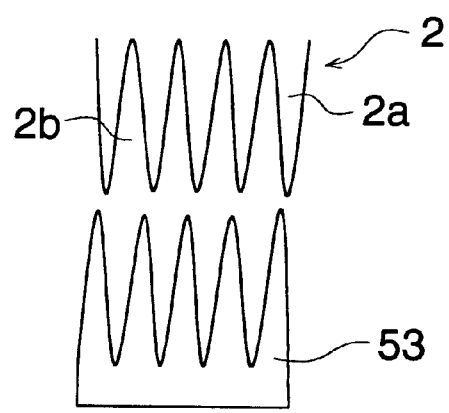

FIG. 2 is a perspective view showing another embodiment of the heat exchanger. The heat exchanger in this embodiment 1 has a structure such that the laminate spaces 2a and 2b are formed by bending the thin plate 2 in an alternate manner consecutively, forming the layers being in contact with only one side of the thin plate 2 and the layers being in contact with the other side of the thin plate 2, and both the end planes in the direction of bending are sealed with the blocking members 50 and 51 having the same width as the width of the bends of the thin plate 2; and further, one zigzag end plane formed by bending is sealed with the blocking member 52 as shown in FIG. 2(b), and the other zigzag end plane is sealed with the blocking member 53 as shown in FIG. 2(c).

Further, on the side of the layers being in contact with only one side of the thin plate 2 there is provided a cover member 15 having the entrance 14, and on the side of the layers being in contact with the other side of the thin plate 2 there is provided the cover member 17 having the entrance 16. The heat exchanger is thus made up in a manner such that the fluid coming through the entrance 14 enters into the laminate space 2a, and goes out of the laminate space through the side which is not sealed by the blocking member 52; and further, the fluid coming through the entrance 16 enters into the laminate space 2b, and goes out of the laminate space 2b through the side which is not sealed with the blocking member 53.

In this manner, the zigzag end planes on both sides of the thin plate 2 are sealed, and the entrances for fluids are provided on the plane containing the bending portions, hence, the entrances and exits for fluids can be made simply at low cost.

Moreover, the heat exchanger has a structure such that the laminate spaces 2a and 2b are formed by bending the thin plate 2 in an alternate manner consecutively, and at the zigzag end planes the blocking members 52 and 53, the zigzag-shaped members, are pressed from left and right to prevent the leakage of fluids by sealing the thin plate 2 and the blocking members 52 and 53, the zigzag-shaped members, with a bonding means. In this way, due to the structure such that the blocking members 52 and 53, the zigzag-shaped members, are pressed from left and right to prevent the leakage of fluid by sealing the thin plate 2 and the zigzag-shaped members, the leakage of fluid hardly occurs and the heat exchanger is excellent in resistivity to high temperatures, high pressures, and corrosiveness, and can be manufactured simply at low cost. As for the bonding means, any one of bonding with an adhesive, welding, soldering, and insertion of a packing material can be employed, and the structure for preventing the leakage of fluid can be made simply.

The zigzag of the thin plate is inclined slightly with regard to the horizontal plane, and the laminate-space portion of the blocking members 52 and 53, the zigzag-shaped members, has a shape like a trapezoid, so that the structure for preventing the leakage of fluid can be made simply.

Figure 3:
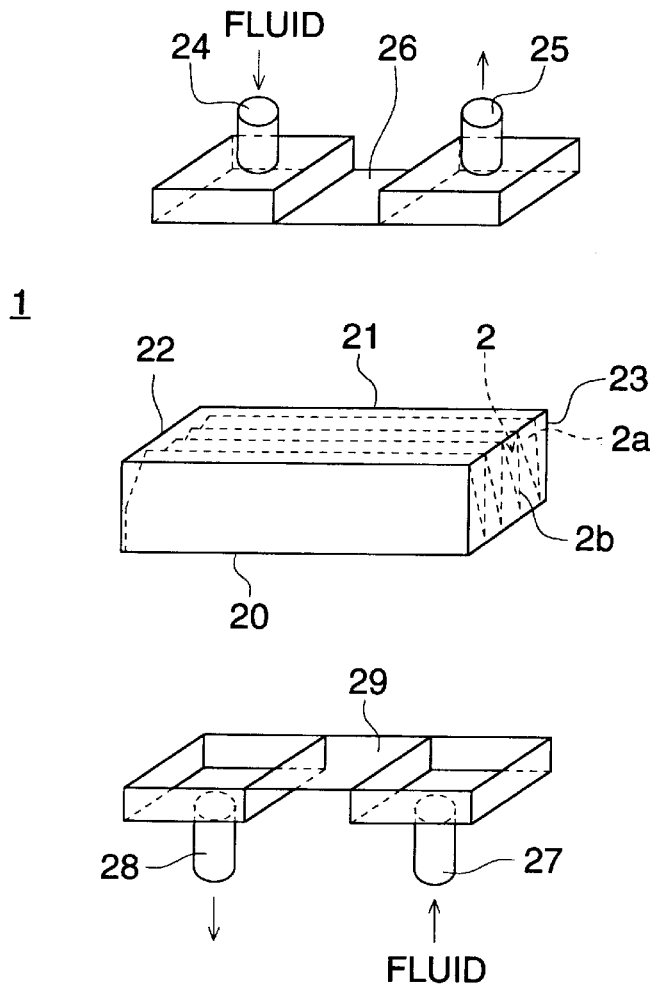
FIGS. 3(a) and 3(b) are perspective views of another embodiment of the heat exchanger.
Figure 3:
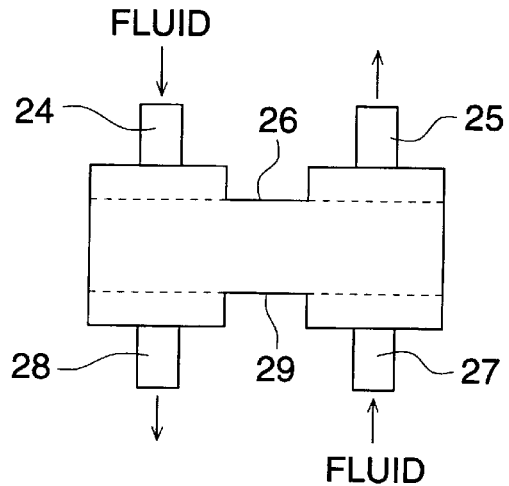

FIG. 3 is a perspective view showing another embodiment of the heat exchanger. In the heat exchanger in this embodiment 1, the laminate spaces 2a and 2b are formed by bending the thin plate 2 in an alternate manner consecutively, and the layers being in contact with only one side of the thin plate 2 and the layers being in contact with the other side of the thin plate 2 are formed; and further, the both end planes in the direction of bending are sealed with the blocking members 20 and 21 having the same width as the width of the bends of the thin plate 2, and the both zigzag end planes formed by bending are sealed with the blocking members 22 and 23 having the same width as the width of the bends of the thin plate 2.

Further, on the side of the layers being in contact with only one side of the thin plate there is provided the cover member 26 having the entrance 24 and the exit 25, and on the side of the layers being in contact with the other side of the thin plate 2 there is provided the cover member 29 having the entrance 27 and the exit 28. The heat exchanger is thus made up in a manner such that the fluid coming through the entrance 24 enters into the laminate space 2a and goes out of the exit 25, and the fluid coming through the entrance 27 enters into the laminate space 2b and goes out of the exit 28.

In this manner, by covering the planes containing the bending portions of the thin plate 2 with the cover members 26 and 29 which are the members provided with the entrance and exit for fluid, the entrances and exits for fluids can be made simply at low cost.

Moreover, the both end planes containing the bending portions of the thin plate 2 are covered with the cover members 26 and 29 which are the members having the entrances 24 and 27 respectively and having the exits 25 and 28 respectively, the entrances and exits being positioned apart from each other respectively, and the fluids for both respective planes can be made to flow in the reverse direction to each other, which improves the efficiency of heat exchanging, and the entrances and exits of fluids can be made simply at low cost.

Figure 4:
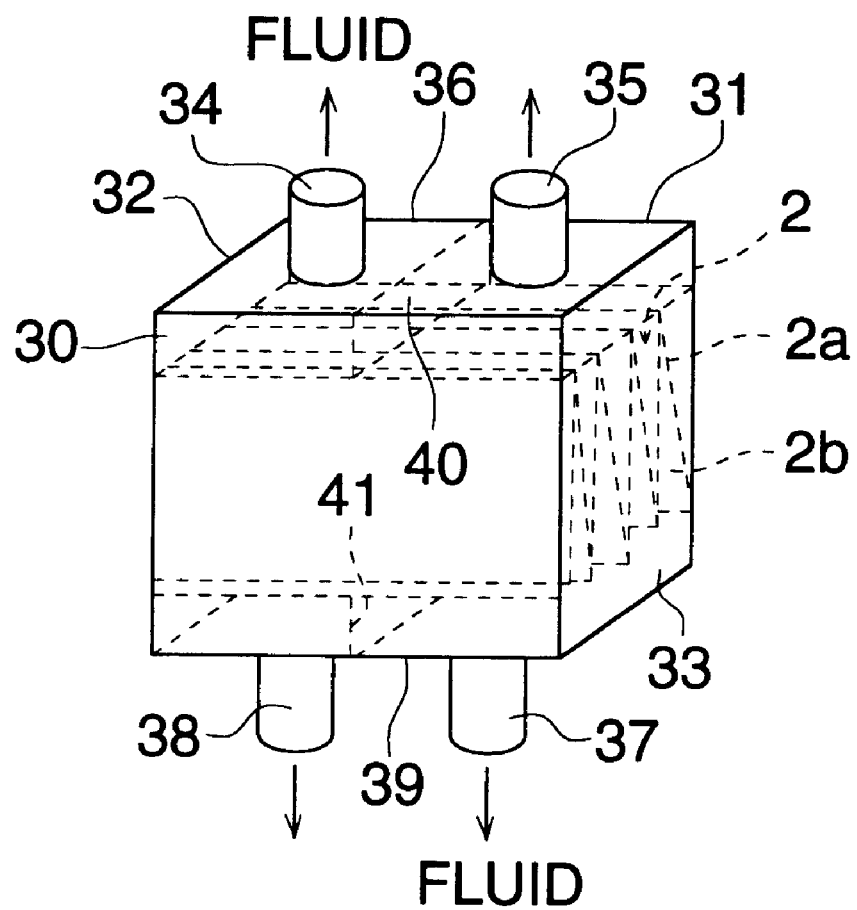
FIG. 4 is a perspective view of another embodiment of the heat exchanger.

FIG. 4 is a perspective view showing further another embodiment of the heat exchanger. In the heat exchanger in this embodiment 1, the laminate spaces 2a and 2b are formed by bending the thin plate 2 in an alternate manner consecutively, and the layers being in contact with only one side of the thin plate 2 and the layers being in contact with the other side of the thin plate 2 are formed; and further, the both end planes in the direction of bending are sealed with the blocking members 30 and 31 having a wider width than the width of the bends of the thin plate 2, and the both zigzag end planes formed by bending are sealed with the blocking members 32 and 33 having a wider width than the width of the bends of the thin plate 2.

Further, on the side of layers being in contact with only one side of the thin plate 2 there is provided the cover member 36 having the entrance 34 and the exit 35, and on the side of the layers being in contact with the other side of the thin plate 2 there is provided the cover member 39 having the entrance 37 and the exit 38. Furthermore, to the side of the cover member 36, there is provided the dividing plate 40 against the cover member 36, the blocking member 30, and the blocking member 31, and to the side of the cover member 39, there is provided the dividing plate 41 against the cover member 39, the blocking member 30, and the blocking member 31. The heat exchanger is made up in a manner such that the fluid coming through the entrance 34 enters into the laminate space 2a and goes out of the exit 35, and the fluid coming through the entrance 37 enters into the laminate space 2b and goes out of the exit 38.

As mentioned above, by covering the planes containing the bending portions of the thin plate 2 with the cover members 36 and 39 each of which is provided with an entrance and exit for fluid, the entrances and exits can be made simply at low cost.

In addition, in the embodiments of FIG. 1 through FIG. 4, by forming using a die the zigzag thin plate and the structures of the end plane portions can be formed. Thus, by forming using a die, the laminate spaces having a shape formed by bending a thin plate in an alternate manner consecutively can be simply manufactured.

In the embodiments of FIG. 1 through FIG. 4, for the thin plate 2, any material capable of bending such as a metallic material selected from the group of aluminum, stainless steel, steel, and titanium, a plastic sheet material selected from the group of polyethylene, polypropylene, polyvinyl chloride, polyvinylidene chloride, polyethylene-terephthalate, and nylon, woven cloth, unwoven cloth, paper, fiber plate, and ceramic material, and suitable one can be selected in accordance with the use.

Further, in comparison with the conventional method of plural plate laminating, an extremely thin plate can be used, which enables the heat exchanging capability to become of high performance. Moreover, using the method of molding, a heat exchanger made of material incapable of bending or excellent in high-pressure resistivity can be manufactured. Furthermore, for the use at high temperatures or high pressures, metallic, ceramic, or plastic materials are suitably used.

In the following, the manufacturing of the heat exchanger will be explained.

Figure 5:
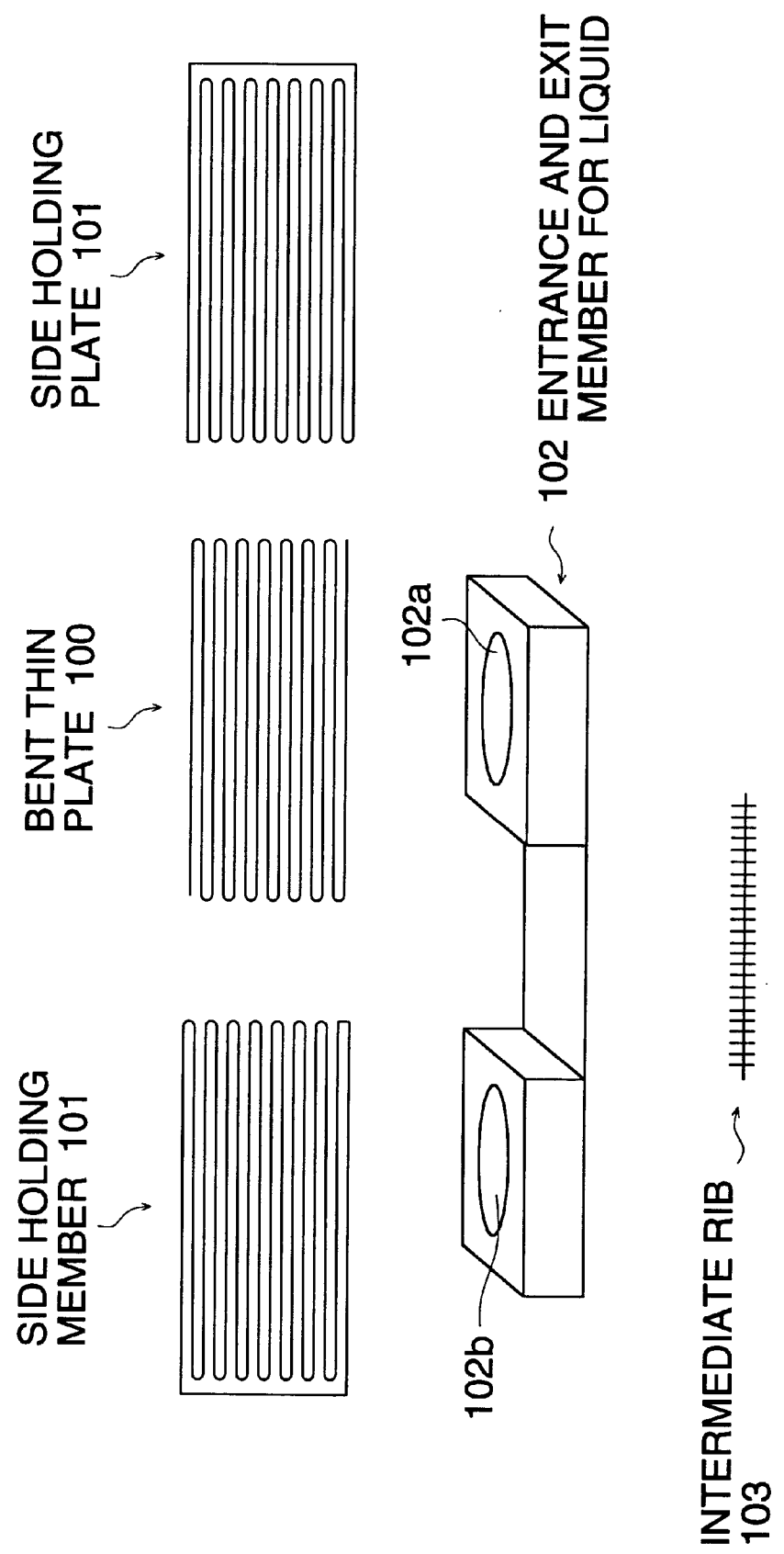
FIG. 5 is a drawing showing how to manufacture the heat exchanger.

In the first embodiment of the manufacturing of the heat exchanger, as is shown in FIG. 5, the thin bent plate 100 is made of a thin plate (aluminum, or SUS) by a bending press. For pieces of the side holding member 101 are made by forming using a die. Two pieces of the entrance and exit member for fluid 102, which is the side plate having the entrance and exit 102a and 102b, are made by forming with a die, welding, and bonding with an adhesive. An intermediate rib member for maintaining the shape 103 is made if necessary. The thin bent plate is fitted with the side holding members 101 and the intermediate rib member 103 and they are bonded by welding, adhesion, rubber packing, etc., and next the entrance and exit members for fluid 102 are bonded by welding, adhesion, rubber packing, etc. The comb teeth of the side holding member 101 are a little tapered not only for the ease of insertion but also for easy flow of the wind at the entrance and exit, so that the heat exchanger may have a structure of highly tight sealing at low cost.

Further, in the second embodiment of the manufacturing of the heat exchanger, the side holding member 101 is merely a quadrangle plate and the structure is supported by the intermediate rib member 103; and further, the thin bent plate 100 and the side holding member 101 are fixed by bonding with an adhesive, rubber packing, etc.

Figure 6:
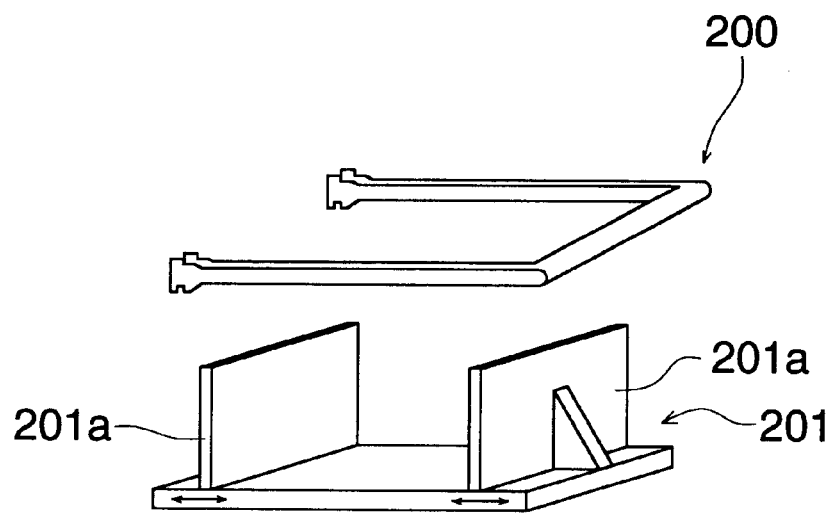
FIGS. 6(a) and 6(b) are drawings showing how to manufacture the heat exchanger.
Figure 6:
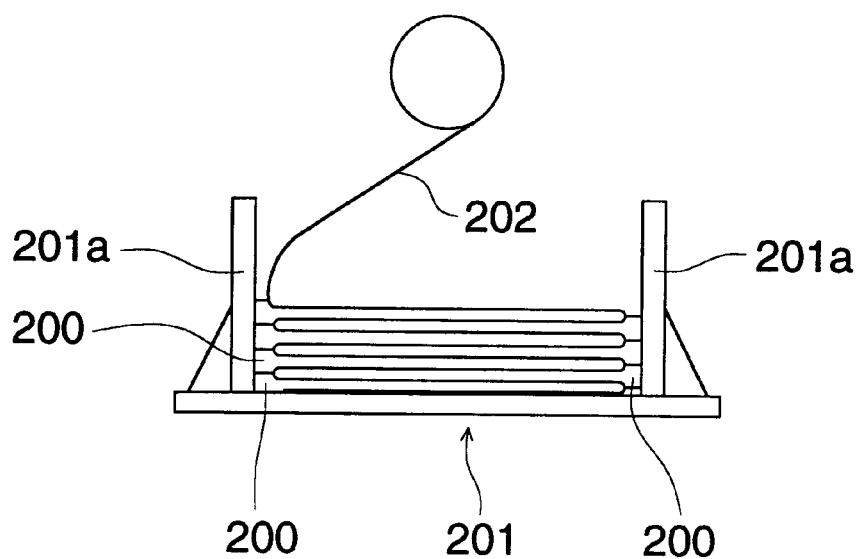

Furthermore, in the third embodiment of the manufacturing of the heat exchanger, as is shown in FIG. 6, a number of pieces of the holding member 200, the number being corresponding to the number of bends, are manufactured. Moreover, the guide fixture 201 is made. The side plate 201a of the guide fixture 201 is movable.

As is shown in FIG. 6(b), using the above-mentioned holding members 200 and guide fixture 201, the manufacturing is carried out by extending and bending repeatedly the rolled thin plate, with the holding members fitted alternately. The laminate spaces are formed by bending the thin plate 202 in an alternate manner consecutively, and after the side holding members 101 shown in FIG. 5 are welded and bonded, the guide fixture is removed. Then, the entrance and exit members for fluid shown in FIG. 5 are fixed by welding, adhesion, rubber packing, or else.

Figure 7:
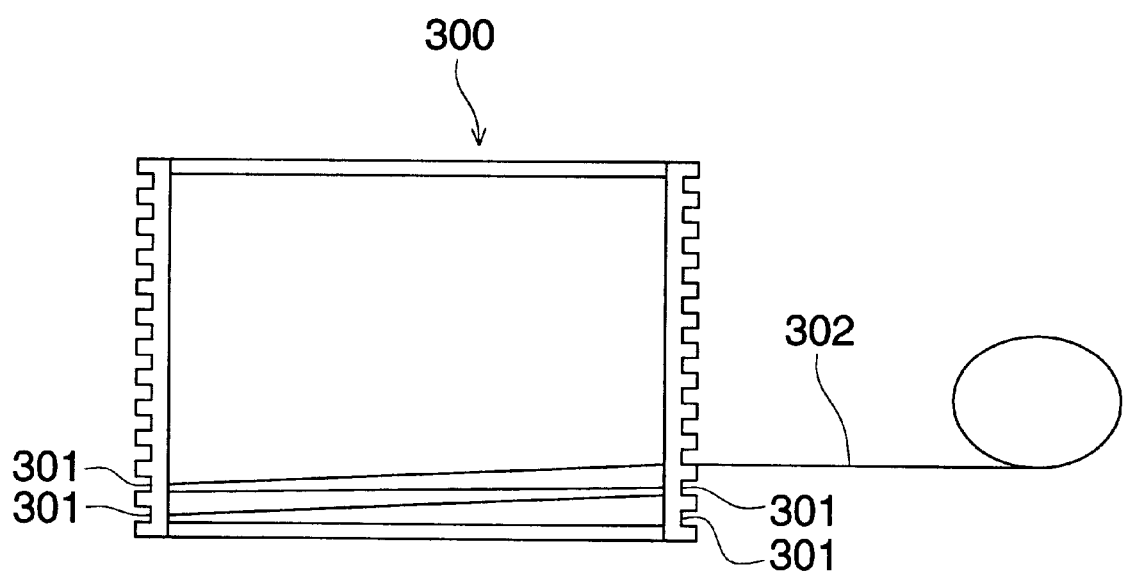
FIG. 7 is a drawing showing how to manufacture the heat exchanger.

Further, in the fourth embodiment of the manufacturing of the heat exchanger, as is shown in FIG. 7, two pieces of the side frame 300 are made by forming with a die, welding, and bonding with an adhesive. Then, the bend regulating rods 301 are cut from the long material. While the side frame 300 is alternately inverted repeatedly, one of the bend regulating rods is set to the position for each inverting, and the rolled thin plate 302 is extended and bent around the rod by each inverting to make up the consecutive bend structure of the thin plate 302. Further, the side holding members 301 and the intermediate rib member 303 are set to the position and welded, bonded with an adhesive, and fitted by rubber packing. In addition, the entrance and exit members for fluid 102 shown in FIG. 5 are welded, bonded with an adhesive, and fitted by rubber packing.

In this manner, by using bend regulating rods 301 at the bending positions of the thin plate 302, the thin plate is provided in a shape to turn around the rod members so that the bending portions of the thin plate 302 can be securely formed.

Further, in the case where the thin plate 302 is flexible, the both ends of the thin plate 302 is fixed, using the bend regulating rods, which are the rod members provided at the bending portions of the side frame, and a tension is exerted laterally to enable the plate to keep horizontality. By employing the flexible thin plate 302, the laminate spaces can be easily formed in a shape of bending in an alternate manner consecutively, an extremely thin material can be used in comparison with the conventional method of plural plate laminating, and it is possible to make the heat exchanging capability of high performance.

Furthermore, in the fifth embodiment of the manufacturing of the heat exchanger, the side frame 300 in the embodiment of FIG. 7 is made a fixture. That is, the side frame 300 is made up in a manner such that the setting portion for the bend regulating rods 301 is movable inward, and the side frame fixture 300 is removed after fixing the bend structure with another side members.

In addition, in the sixth embodiment of the manufacturing of the heat exchanger, the bend regulating rods 301 in the fifth embodiment are made as a fixture.

Figure 8:
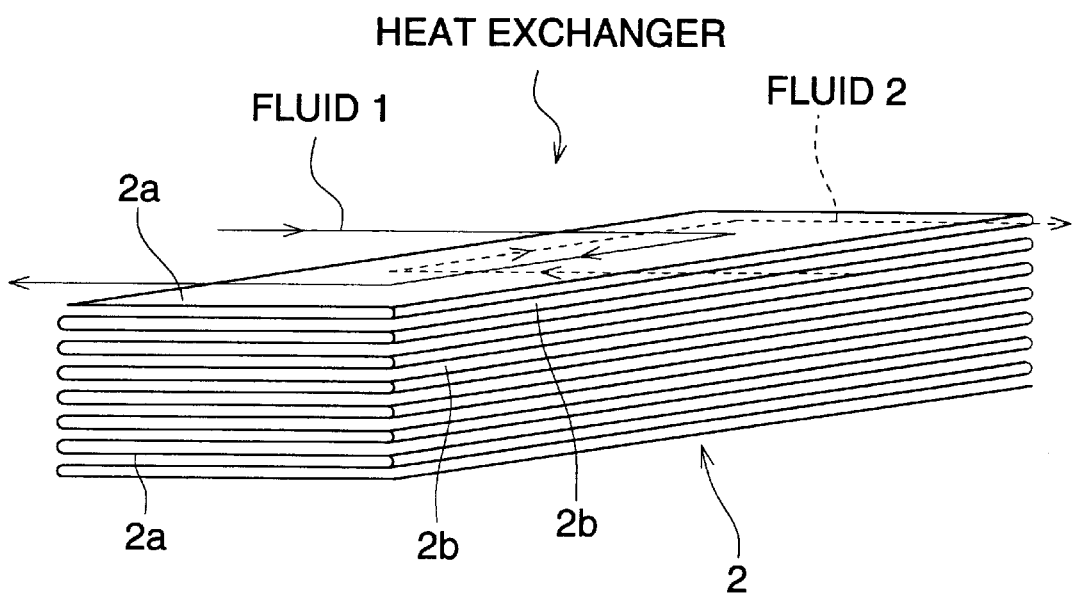
FIG. 8 is a drawing showing the flow of fluids in the heat exchanger.

The directions of the flows of the fluid 1 and fluid 2 in the heat exchanger 1 manufactured in the above-mentioned manner are shown in FIG. 8, and the fluids 1 and 2 flow through the laminate spaces 2a and 2b, which are formed by bending the thin plate, respectively.

Figure 9:
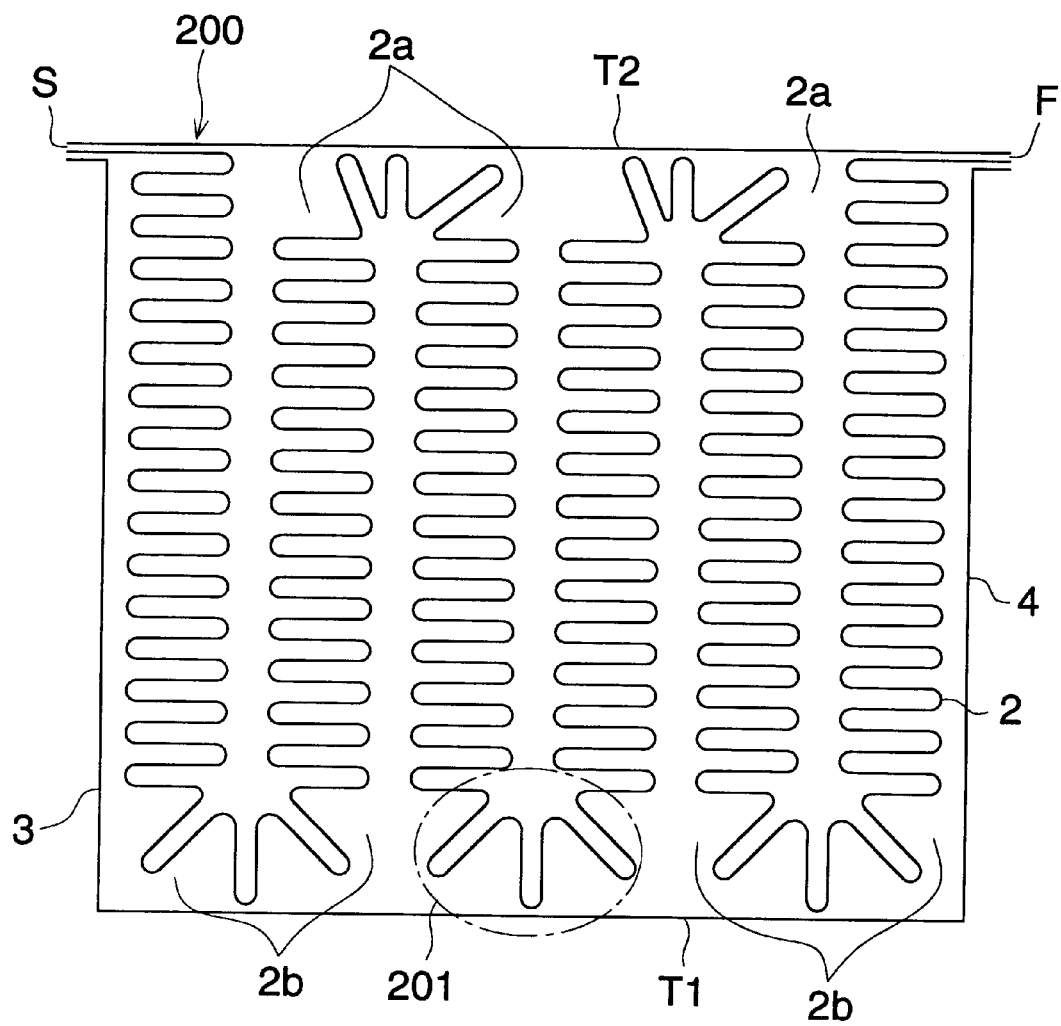
FIG. 9 is a cross-sectional view of another embodiment of the heat exchanger.
Figure 10:
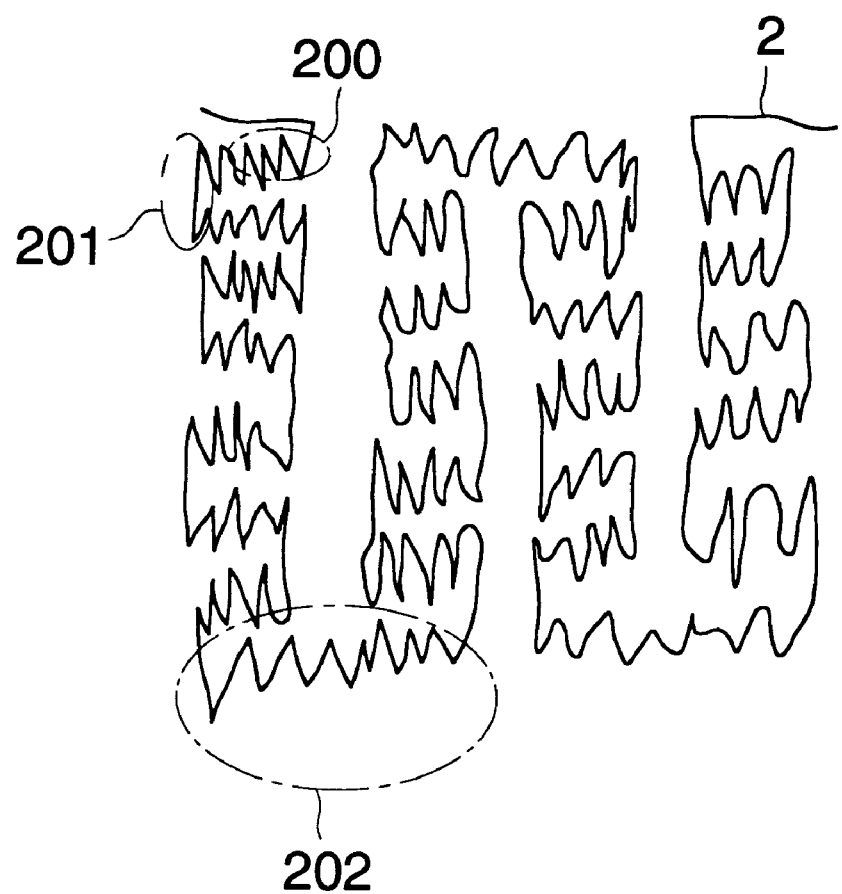
FIG. 10 is a cross-sectional view of another embodiment of the heat exchanger.
Figure 11:
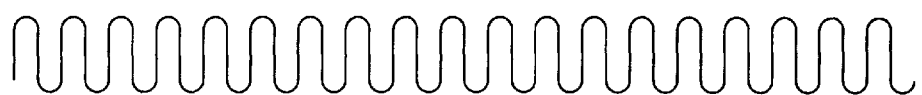
FIGS. 11(a) to 11(i) are cross-sectional views of various embodiments of the shape of bending of the thin plate.
Figure 11:
Figure 11:
Figure 11:
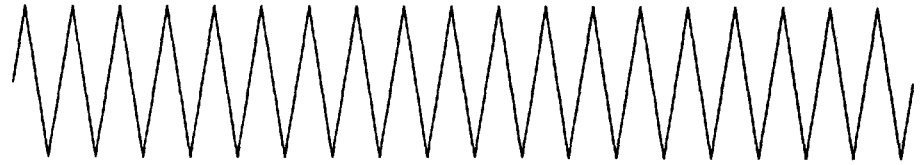
Figure 11:
Figure 11:
Figure 11:
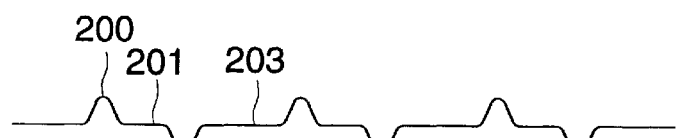
Figure 11:
Figure 11:
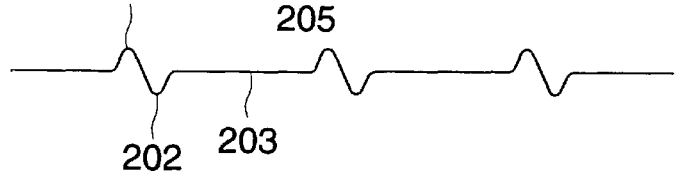

In the above-mentioned embodiments, examples wherein the heat exchanging portion is formed by bending a planar thin plate in an alternate manner consecutively has been explained; however, it may be appropriate to make heat exchanging portions as are shown in FIG. 9 and FIG. 10 using the thin plates having a shape shown in FIG. 11. By making the shape as these, the contact area between the heat exchanging portion and fluids is made larger than that in the case where the heat exchanging portion is formed using the planar thin plate, hence, the heat exchanging can be made with a higher efficiency.

EFFECT OF THE INVENTION

According to the structure of the invention, there can be provided the heat exchanger in which the number of machinery parts can be reduced, it may be difficult for fluid leakage to take place on it and high heat exchanging efficiency can be realized.

As described in the foregoing, According to the structure described in the paragraph (1), heat exchanging is carried out by forming laminate spaces through bending a thin plate in an alternate manner consecutively, and making fluids for heat exchanging flow through the layers being in contact with only one side of said thin plate and through the layers being in contact with the other side of said thin plate respectively; and further, due to the laminate spaces formed by bending the thin plate in an alternate manner consecutively, the number of parts is reduced, and it is easy to build an automatic assembly line, and further, leakage of fluid hardly occurs, and the heat exchanger is excellent in resistivity to high temperatures, high pressures, and corrosiveness, is of low cost and can be easily manufactured.

According to the structure set forth in the paragraph (2), rod members are provided at the bending portions of the thin plate, in a manner such that the thin plate turns around said rods in winding contact; hence, thin plate turns around the rod in a shape of winding contact, and the bending portions of the thin plate can be formed securely by the rod members.

According to the structure set forth in the paragraph (3), the thin plate has flexibility and its both ends are fixed so that a tension can be exerted laterally by said rod members to keep horizontality; hence, the laminate spaces can be easily formed out of the flexible thin plate in a shape of consecutive alternate bending, and it is possible to employ an extremely thin plate material in comparison with the conventional method of laminating a plurality of plates, which enables the high performance of the heat exchanging capability.

According to the structure set forth in the paragraph (4), the laminate spaces are formed by bending a thin plate in an alternate manner consecutively, its zigzag end planes being sealed, so that fluids come into or out of the laminate spaces through the planes containing the bending portions; hence, it is simple the structure for sealing the end plane of the plural laminate layers and for providing an entrance and exit to the laminate spaces for fluids, the number of parts is reduced, and leakage of fluid hardly occurs; and further, the heat exchanger is excellent in resistivity to high temperatures, high pressures, and corrosiveness, and can be manufactured simply at low cost.

According to the structure set forth in the paragraph (5), the zigzag end plane is sealed and the entrance and exit for fluid is provided at the aforesaid plane having the bend portions, hence, it is possible to make the entrance and exit of fluids simply at low cost.

According to the structure set forth in the paragraph (6), the plane containing the bending portions is covered with a member provided with an entrance and exit for fluid, hence the entrance and exit for fluid can be made simply at low cost.

According to the structure set forth in the paragraph (7), both of the planes of the thin plate containing the bending portions are covered with a member having an entrance and an exit at the positions apart from each other so that fluids for both planes are made to flow in the reverse direction to each other, hence, the efficiency of heat exchange is improved and the entrances and the exits can be made simply at low cost.

According to the structure set forth in the paragraph (8), due to the structure such that a thin plate is bent in an alternate manner consecutively to form laminate spaces, and at each of the zigzag end planes, a zigzag-shaped member is pressed to it from left or right so as to seal the thin plate and the zigzag-shaped members with a bonding means to prevent leakage of fluid, leakage of fluid hardly occurs and it is excellent in the resistivity to high temperatures, high pressures, and corrosiveness, and can be manufactured simply at low cost.

According to the structure set forth in the paragraph (9), the bonding means is any one of bonding with an adhesive, welding, soldering, and insertion of a packing material, hence, the structure for preventing the leakage of fluid can be simply made with the bonding means.

According to the structure set forth in the paragraph (10), the zigzag of the thin plate is slightly inclined with regard to the horizontal plane and the laminate-space portion of the zigzag-shaped member has a shape like a trapezoid; hence, the structure for preventing the leakage of fluid can be simply made.

According to the structure set forth in the paragraph (11), the zigzag thin plate and the structures of the end plane portion described in the paragraphs (4) through (7) are made by forming using a die; hence, the laminate spaces formed by bending a thin plate in an alternate manner consecutively can be made simply by forming using a die.

What is claimed is:

1. A heat exchanger for exchanging heat between a first fluid and a second fluid comprising:

a thin plate bent alternately consecutively to form a plurality of valley-shaped spaces, wherein a cross section of each of said plurality of valley-shaped spaces is a trapezoid; and at least one end plate having a plurality of projections, wherein each said projections is trapezoid complementary to the trapezoidal cross section of said spaces;

said projections being inserted into said spaces to form a first flow passage on a first side of said thin plate and a second flow passage on a second side of said thin plate, wherein said first fluid flows in said first flow passage, said second fluid flows in the second flow passage, and heat is exchanged through said thin plate.

2. The heat exchanger of claim 1, wherein a rod member is provided at each of the bent portions in such a manner that the thin plate goes around the rod member in contact and turns back.

3. The heat exchanger of claim 1, wherein the thin plate has flexibility and its both ends are fixed so that a tension is exerted laterally by rod members to keep horizontality.

4. The heat exchanger of claim 1, wherein an entrance and an exit for fluid is provided at planes including the bent portions.

5. The heat exchanger of claim 1, wherein planes including the bent portions is covered with a member provided with an entrance and an exit for fluid.

6. The heat exchanger of claim 1, wherein both of the planes including the bent portions are covered with a member provided with an entrance and an exit for fluid at positions apart from each other so that fluids for both planes are made to flow in the reverse direction to each other.

7. The heat exchanger of claim 1, wherein zigzag end planes of the alternately-consecutively-bent thin plate are pressed with zigzag-shaped plates and sealed by the zigzag-shaped plates with bonding member so as to prevent fluid leakage.

8. The heat exchanger of claim 7, wherein the bonding member is one of bonding with an adhesive, welding, soldering, and insertion of a packing material.

9. The heat exchanger of claim 1, wherein the alternately-consecutively-bent thin plate and the zigzag end planes are formed by using a model.

10. The heat exchanger of claim 1 wherein there are a first said end plate and a second said end plate and wherein said first end plate is at one end of said spaces and inserted into said spaces on said first side of said thin plate, and said second end plate is another end of said spaces and inserted into said spaces on said second side of said thin plate.

11. The heat exchanger of claim 1 wherein a top and a bottom of said spaces are each covered with a cover having a port.

12. A heat exchanger for exchanging heat of fluids comprising a heat exchange section having a shape bent alternately consecutively to define a laminate space;

a first flow passage in a first space, in contact with a first surface of said heat exchange section, and in said laminate space; and a second flow passage in a second space, in contact with a second surface of said heat exchange section, and in said laminate space, said first flow passage adapted to permit a first fluid to flow therethrough and said second flow passage adapted to permit a second fluid to flow therethrough;

an alternately consecutively bent thin plate defining said heat exchange section, zigzag end planes of said thin plate sealed whereby said first fluid and said second fluid flow through said laminate space through bent portions thereof;

said bent plate being slanted to a horizontal plane, said laminate space being in the form of a trapezoid.

* * * * *